Patented Dec. 31, 1929

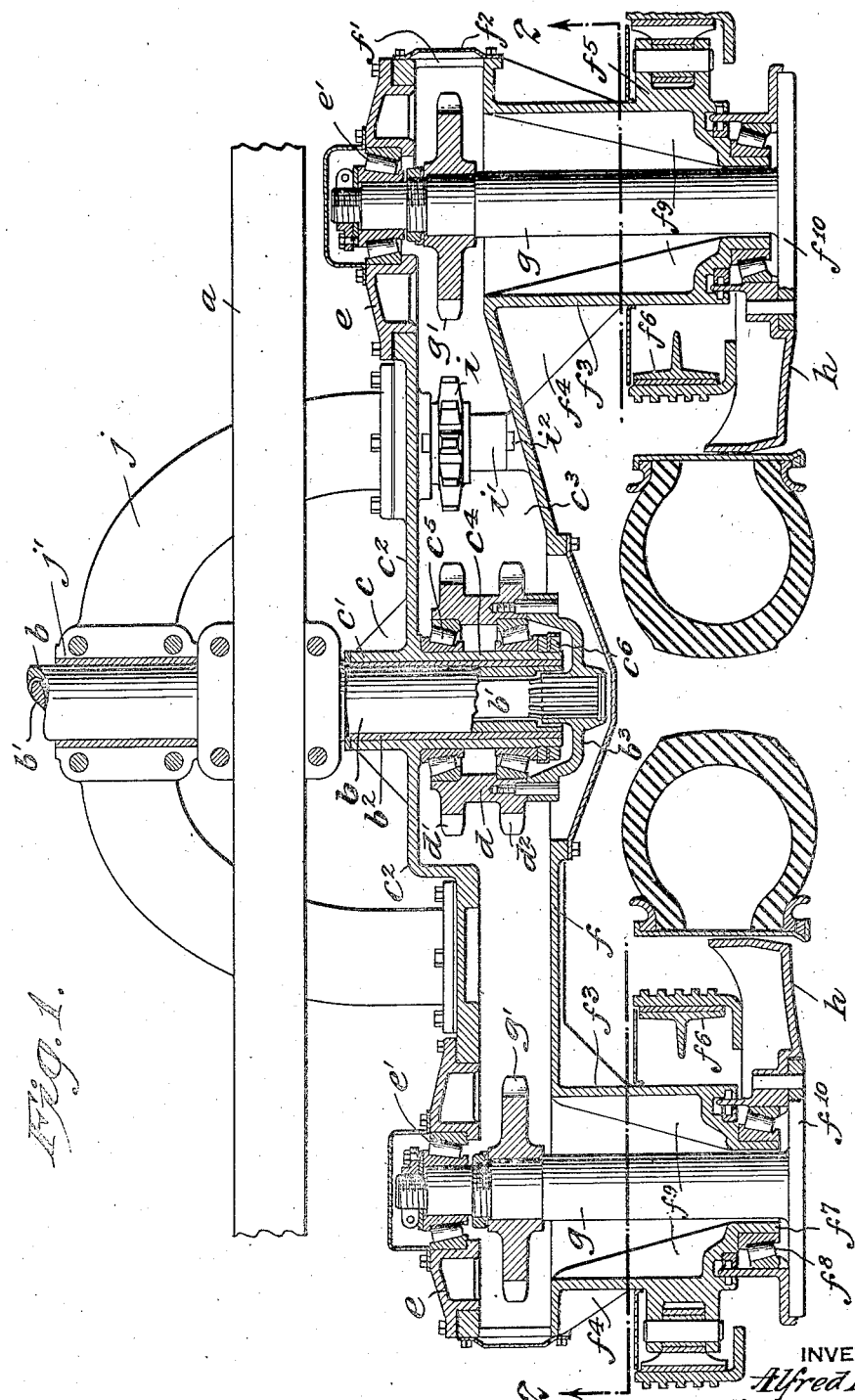

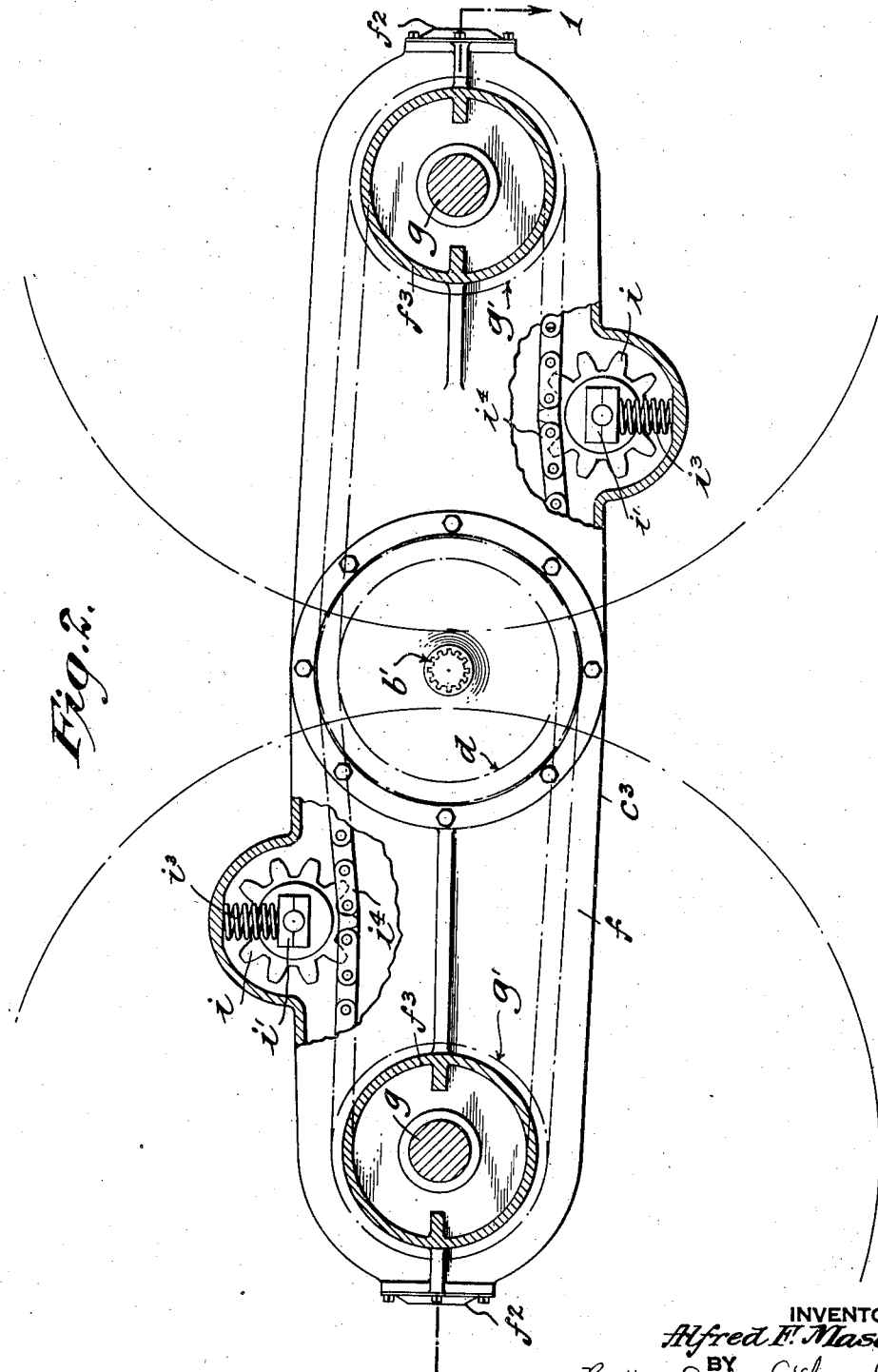

1,741,425

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

DRIVING MECHANISM FOR SIX-WHEEL VEHICLES

Application filed August 17, 1928. Serial No. 300,167.

The present invention relates to motor vehicle drives of the type using four rear driving wheels, the wheels being suitably connected to mount the vehicle frame. In many designs of this type, the unsprung weight, or the weight mounted on the axles, including the several differentials for proportioning power properly between the several wheels, is very great. In addition, these drives have included a considerable number of parts to require servicing from time to time.

The construction embodying this invention provides a drive of the above character which is light and formed of a fewer number of parts, at the same time being sprung and fully capable of meeting all the severe strains received during service. More particularly, the structure includes a pair of driving wheels mounted as a unit at each side of the vehicle. These pairs are independently mounted and each wheel of the respective pairs receives its power from a common source, the power being through chains, thus eliminating added differentials.

Each wheel of a driving pair is mounted upon a stub shaft which is mounted in the end of a unitary carriage mounted upon the axle. Suitable bearings are included to mount the jack shaft sections as well as the stub shafts at either end of the unitary carriage and the latter is formed to receive driving chains which are mounted over the jack shaft sprockets and cooperating sprockets on the stub shafts.

Further details and advantages will appear as the invention is described more fully in connection with the accompanying drawings, wherein:

Figure 1 is a plan view, partly in section, showing a construction embodying the present invention and taken on line 1—1 of Figure 2.

Figure 2 is a view in section, partly broken away, and taken on line 2—2 of Figure 1.

Referring to the above drawings, $a$ indicates a vehicle spring mounted at one side of the chassis. The usual axle $b$ is secured to the spring in a well known manner and carries a jack shaft $b'$. Outwardly of the spring, the axle $b$ is provided with a bearing sleeve $b^2$ and a bracket $c$ formed with a sleeve $c'$ engaging over the bearing sleeve. The sleeve $c'$ and bracket $c$ are formed with a side wall structure $c^2$ of a carriage $c^3$ and the inwardly projecting portion $c^4$ of the sleeve mounts bearings $c^5$. A cylindrical driving member $d$ formed with sprocket teeth $d'$ and $d^2$ is mounted upon the extension $c^4$ through the bearings $c^5$ and the end of jack shaft $b'$ is provided with a hub $b^3$ which is secured to the sprocket member $d$. The hub $b^3$ is cup-shaped to receive the outer extremity of the projecting portion $c^4$ of the sleeve $c'$ and within this cup-shaped portion, adjusting members $c^6$ are provided for adjusting the bearings.

The outer extremities of the side walls $c^2$ are formed with apertures which receive caps $e$ in which are mounted bearings $e'$. An outer side wall $f$ is secured to the side wall $c^2$ to form an enclosure for the driving mechanism to be described hereinafter. The ends of the side walls may be connected by a suitably formed flange or a spacing member $f'$, over which is secured a closure strip $f^2$. Opposite the caps $e$, cylindrical extensions $f^3$ are formed in the outer side wall $f$, the wall and extensions being suitably reinforced by gussets $f^4$. The extensions $f^3$ may conveniently be formed with a brake spider $f^5$ for mounting suitable brake shoes $f^6$ as clearly shown in Figure 1. The outer extremities of the extensions are formed with flanges $f^7$ which carry bearings $f^8$ and reinforcing ribs $f^9$ may be formed to strengthen the extensions. Stub shafts $g$ are mounted in bearings $e'$ at one end and extend through the cylindrical portions $f^3$ to be mounted through their flanged portions $f^{10}$ and wheel $h$ in bearings $f^8$. Sprocket wheels $g'$ are mounted upon the stub shaft and cooperate with the respective sprocket teeth $d'$ and $d^2$.

Within the carriage $c^3$, idler sprockets $i$ are provided, these sprockets being mounted in blocks $i'$ which are slidably carried in grooves $i^2$ formed in the carriage. Springs $i^3$ urge the blocks away from the housing and take up the slack in chains $i^4$ which connect the driving and driven sprockets.

In order to reinforce the structure against twisting stresses, a supporting tube $j$ is mounted upon the axle at $j'$ and is secured to the carriage at either side of the axle extension. Figure 2 shows the manner in which the chains are connected to cause both wheels to rotate in the same direction and transmit the driving power from the sprockets to the stub shafts. In addition to taking up the slack in the chains, the idler sprockets cause the chains to wrap around the driving and driven sprockets to utilize a greater number of teeth for transmitting the driving torque.

Although the invention has been described in connection with the specific construction shown in the accompanying drawings, it is not to be limited, save as defined in the appended claims.

I claim as my invention:

1. A mounting for a plurality of driving wheels comprising an axle, a carriage pivoted on the axle, stub axle carrying extensions on the carriage, means to mount wheels in the extensions, braking mechanism and means on one of the extensions to mount the braking mechanism.

2. A mounting for a plurality of driving wheels comprising an axle, opposed plates, means to secure the plates together to form a carriage, means to pivot the carriage upon the axle, apertures in one of the plates at the ends thereof, caps for the apertures, means to journal a shaft in the caps, extensions in the opposite plate aligned with the apertures, shaft sections, means to journal the shaft sections in the first mentioned journals and in the extensions, brake spiders on the extensions, a jack shaft in the axle and extending into the carriage, and means to drive the shaft sections from the jack shaft.

This specification signed this 14th day of August, A. D. 1928.

ALFRED F. MASURY.